United States Patent [19]

Todd

[11] Patent Number: 4,882,872
[45] Date of Patent: Nov. 28, 1989

[54] LIVE BAIT STORAGE CONTAINER AND METHOD OF USING SAME

[76] Inventor: Harry V. Todd, 2429 Windmill View, El Cajon, Calif. 92020

[21] Appl. No.: 231,195

[22] Filed: Aug. 11, 1988

[51] Int. Cl.⁴ ............................................. A01K 97/04
[52] U.S. Cl. ...................... 43/55; 206/315.11
[58] Field of Search ............................ 43/54.1, 55, 56; 206/315.11, 541; 220/85 R, 87, 91, 94 R, 367

[56] References Cited

U.S. PATENT DOCUMENTS

| | | | |
|---|---|---|---|
| 1,579,560 | 4/1926 | Moore | 43/55 |
| 2,179,095 | 11/1939 | Kelsey | 43/55 |
| 2,328,993 | 9/1943 | Norling | 43/55 |
| 2,507,319 | 5/1950 | Peters | 43/55 |
| 2,673,454 | 3/1954 | Gallie et al. | 43/56 |
| 2,716,834 | 9/1955 | De Bonville et al. | 43/55 |
| 2,849,828 | 9/1958 | Johnson | 43/55 |
| 3,277,599 | 10/1966 | Griffeth | 43/55 |
| 3,452,469 | 7/1969 | White | 43/55 |
| 4,499,998 | 2/1985 | Carlson | 220/284 |

Primary Examiner—Nicholas P. Godici
Assistant Examiner—William Scott Andes

[57] ABSTRACT

A storage container adapted for storing live bait such as worms and for convenient carrying by the user includes a container with slit-like openings to provide proper bait aeration and a closure panel for opening and closing the container to provide easy access to the interior thereof. A moisture storage device in the form of a frozen moisture containing sponge which distributes cool moisture to the contents of the storage container as the sponge thaws releasing its moisture.

8 Claims, 1 Drawing Sheet

U.S. Patent    Nov. 28, 1989    4,882,872
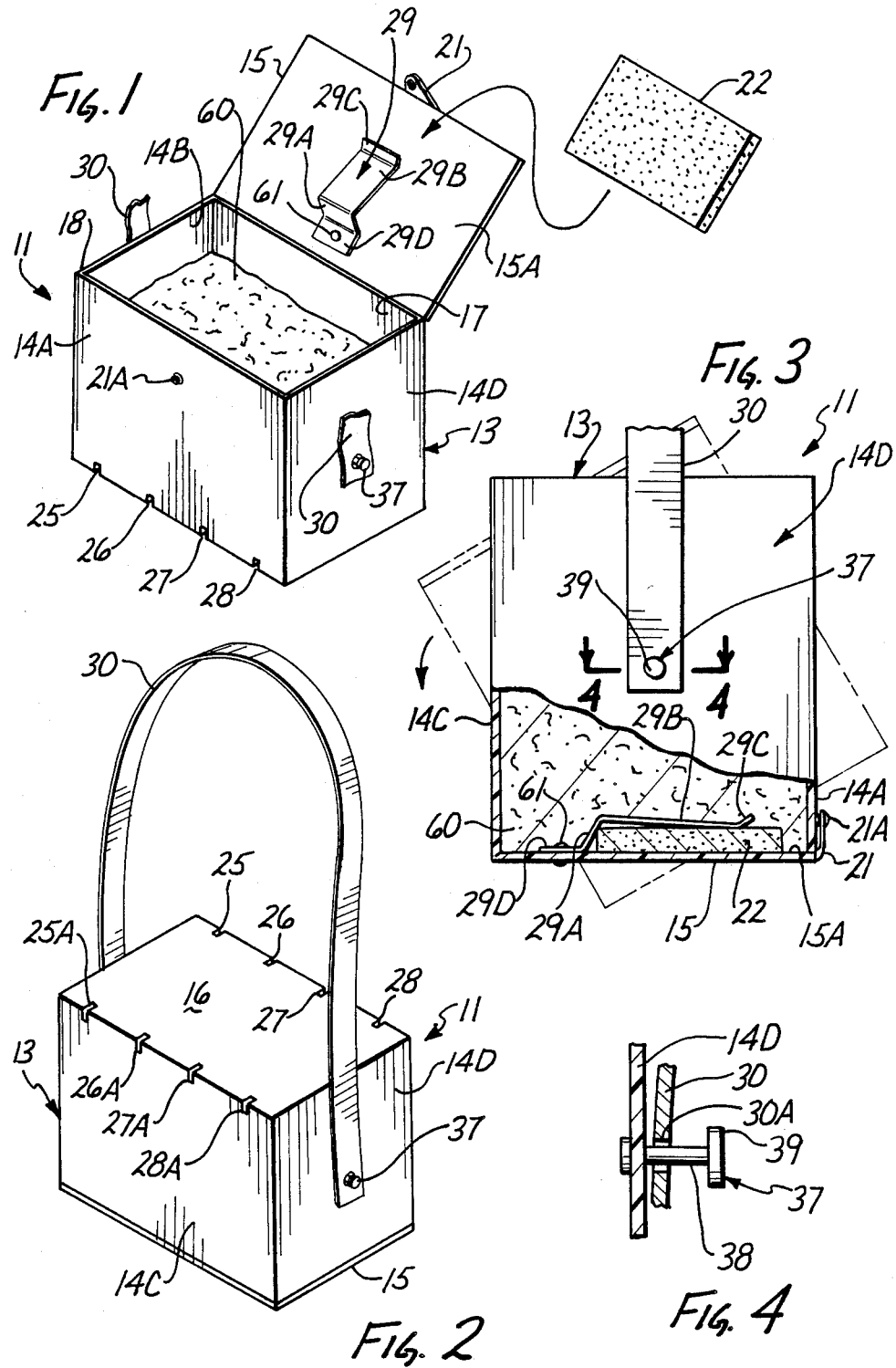

LIVE BAIT STORAGE CONTAINER AND METHOD OF USING SAME

TECHNICAL FIELD

The present invention relates in general to fishing equipment, and more particularly to a bait container for storing and preserving live bait, such as worms, in a healthy environment.

BACKGROUND ART

There have been different types and kinds of bait containers for storing perishable bait such as minnows, shrimp and worms. For example, reference is made to the following U.S. Pat. Nos. 521,244; 2,137,397; 2,613,472; 2,968,887; 4,128,170; and 4,499,998.

While such prior known devices may have been successful in some applications, it has been difficult, if not impossible, to provide a live bait container that would provide a moistened, cool and healthy environment for live bait, such as worms. In this regard, worms generally require storage in a cool surrounding environment, such as dirt, with proper aeration and moisture to assure an environment for sustaining life of the bait being stored, so that it may be used as live fishing bait.

Conventional aerated live bait containers, whether made of various different materials such as wood, plastic, metal or elastomeric materials, are filled with moist dirt or other media for effecting a cool moist environment. However, rapid moisture evaporation problems on hot summer days frequently occur to cause a quick drying effect on the moist dirt, as dry ambient air passes over its surface. This evaporation process quickly removes moisture from the dirt or other media, resulting in the need to re-moisten the dirt to maintain the desired environment.

Methods have been devised to overcome the evaporation problem by either completely enclosing the storage container to minimize evaporation, or by providing cooling techniques to cool the ambient air temperature and thus to reduce evaporation. While these solutions provide some relief, for some applications, they do not substantially reduce the problem as they fail to provide proper aeration for the worms or other live bait to sustain a healthy environment.

Therefore, it would be highly desirable to have a bait storage container device for worms or the like, to provide proper aeration with minimum or reduced evaporation to preserve a cool, moist environment for live bait.

A further problem with conventional live bait containers is that certain worms will usually travel to the cool, moist bottom of the container as the top storage media conditions dry out, thereby making it necessary for a person to perform the undesirable and time consuming awkward task of digging down into the dirt, to uncover and retrieve a worm for its utilization as bait. Moreover, by digging into the dirt, the soil is aerated which further accelerates the evaporation process.

It would therefore also be highly desirable to have a live bait storage container, which would permit easy access to the live bait such as worms, without substantially disturbing the environment of the storage media within the container.

DISCLOSURE OF INVENTION

Therefore, the principal object of the present invention is to provide a live bait storage container which provides a cool, moist, properly aerated environment for worms or other live bait over a prolonged period; which will provide easy and ready access for manual retrieval of the bait; and which is light in weight, easily carried, simple in construction and relatively inexpensive to manufacture.

Another object of the present invention is to help reserve the storage media, with little or no personal attention and without resulting leakage from the container.

Briefly, the above and further objects of the present invention are realized by providing a storage container apparatus, which helps cool and moisturize bait stored in the container.

A live bait storage apparatus includes a container for storing a bait storage media. The container includes a moisture containing device in the form of a sponge, mounted within the container at an access opening, over which a movable closure is mounted. A carrying device is pivotally connected to the container so that it can store the container in an inverted position with the moisture device of the bottom portion of the container for attracting live bait in the media toward the moisture device. To remove bait from the container, it is inverted manually about the carrying device to permit the closure device to be opened, and the bait removed from the media near the access opening.

BRIEF DESCRIPTION OF DRAWINGS

The above mentioned and other objects and features of this invention and the manner of attaining them will become apparent, and the invention itself will be best understood by reference to the following description of the embodiment of the invention in conjunction with the accompanying drawings, wherein:

FIG. 1 is a pictorial view of a live bait storage container, which is constructed according to the present invention, and which is illustrated in its opened condition;

FIG. 2 is a pictorial view of the storage container in FIG. 1, illustrating it in an inverted closed position;

FIG. 3 is an enlarged side elevation view of the storage container of FIG. 1 with a portion thereof cut away to illustrate a moisture containing device at the bottom of the storage container when it is rotated into an inverted position; and FIG. 4 is an enlarged sectional view of the pivotal carrying strap connection of FIG. 3 taken substantially on line 4—4.

BEST MODE FOR CARRYING OUT THE INVENTION

Referring now to the drawings, and more particularly to FIGS. 1-3, there is shown a live bait storage container apparatus 11, which is constructed in accordance with the present invention.

The storage container apparatus 11 generally comprises a container 13 for receiving and holding live bait such as worms (not shown) for living within live bait storage media 60, such as soil or dirt. A closure panel or cover 15 is hingedly mounted to the container 13, for moving between an opened position (FIG. 1), and a closed position (FIGS. 2 and 3) disposed over an opening 17 in the top of the container 13, to confine the worms and soil media in the interior of the container 13 and to provide easy access to the worms when the cover 15 is opened.

A sponge 22 is detachably mounted to the inside surface, generally indicated at 15A, of the cover 15, for providing a reservoir source of cool moisture, which is distributed to the soil media 60 and worms or other bait confined within the interior of the container 13.

The container apparatus 11 is used as a device for storing live bait, such as worms in a cool moistened environment so that they may be preserved in a healthy condition and used as bait for fishing purposes.

In operation, the cover 15 of the container 13 is opened to permit the container to be filled with a suitable quantity of storage media, such as soil 60 for the worms (not shown). The sponge 22 which has previously been filled with water and frozen, is then detachably secured to the inside surface 15A of the cover 15 by a retaining clip 29. The cover 15 is then brought into contact over the container lip or rim 18, thereby closing and sealing the container 13. A retaining latch 21 on cover 15 engages releasably a latch stud 21A projecting from the front face of a front wall 14A, to maintain the cover in closed relationship over the lip or rim 18.

Once the container 13 is sealed, it is flipped over or inverted as indicated by the arrow shown in FIG. 3, causing the contents of the container 13 to come into resting contact with the frozen sponge 22 at the lower portion of the inverter container. The sponge 22 thereafter slowly defrosts to distribute cold moisture which is slowly absorbed into the soil 60 to provide a cool, moist, healthy environment for the worms therein. In this regard, the worms naturally migrate toward the cool, moist sponge.

In order to remove the bait from the container, it is merely flipped over again to rotate it about its horizontal axis until the cover 15 is again at the upper portion of the container. The cover is then moved manually to its opened position, and the worms will be disposed conveniently near the top surface of the soil, so that one or more of them can be removed easily.

Considering now the container 13 in greater detail as shown in FIGS. 1-3, it is generally rectangular in shape and has four mutually perpendicular side walls 14 such as walls 14A, 14B, 14C, and 14D extending upwardly from a bottom wall or base 16. The upper periphery of the side walls 14 such as walls 14A, 14B, 14C, and 14D terminate in the lip or rim 18, which defines the container opening 17. As further illustrated in FIGS. 1 and 2, the lower portion of the container walls 14A and 14C are adapted with a plurality of slit-like openings indicated at 25, 26, 27, 28, and 25A, 26A, 27A 28A respectively, which are sufficiently narrow in width to prevent both the worms and soil 60 located inside the container 13, from being discharged therefrom. The slit-like openings, such as the openings 25, 27, and 28 of the container 13 permit air to enter the interior 19 of the container 13 once the container 13 is inverted as illustrated in FIGS. 2 and 3. Also by inverting the container, the worms contained in the container 13 migrate toward the sponge 22 so that when the container is returned to its normal upright position to open its cover, the worms can be readily uncovered at the surface of the soil 60, and readily availabe to be physically removed from the container 13 to be used as live bait.

Each one of the openings is generally L-shaped. The openings 25-28 each extends between the bottom wall or base 16 and the wall 14A at the corner therebetween. Similarly, each one of the openings 25A-28A extend between the base 16 and the wall 14C at the corner therebetween.

As further illustrated in FIGS. 1-3, two opposite parallel walls 14B and 14D are adapted with outwardly projecting pins or studs 37 and 37A (not shown) for receiving rotatably the opposite ends of a flexible carrying strap 30. Each one of the carrying strap pins are similar to one another, and only the pin 37 will now be described in greater detail. As shown in FIG. 4, the pivot pin 37 projects perpendicularly from the container wall 14D and terminates at its front end in a head or enlarged portion 39. A shaft 38 of the pin 35 extends through a hole 30A at the end of the strap 30, and is generally cylindrical in shape having its head 39, which is of a greater diameter than the pin shaft 38. Thus, the head 39 restrains the strap 30 on the shaft 38. The hole 30A is sufficiently larger in diameter than the diameter of the shaft 38, to permit the entire apparatus 11 to pivot about the axis of the pivot pins loosely received within the apertured ends of the strap 30.

Considering now the shoulder strap 30 in FIG. 2, there is shown the shoulder carrying strap 30, the opposite ends of which are attached to opposite ends of the container 13 by the pivot pins which enable the container to be conveniently and easily carried in an inverted manner as illustrated in FIG. 2.

As shown in FIG. 1, the cover 15 is pivotally secured to container wall 14C by a hinge (not shown), and is dimensioned so as to cover over snugly rim 18 of the container 13 when the cover 15 is so disposed covering rim 18, it prevents the contents of the container 13 from falling therefrom, when the container is carried in its inverted position of FIG. 2. As further illustrated in FIGS. 1, 2 and 3, the inner surface 15A of the cover 15 is adapted to receive the spring retaining clip 29 for receiving and holding the sponge 22 by pressing it against the inside surface 15A of the cover. The sponge illustrated in FIG. 1 is approximately rectangular in shape and is in the shape of a block. The size of the sponge 22 is also determinative of the latent reservoir of water that may be discharged therefrom as the frozen water in the sponge 22 melts and is disbursed within the soil 60.

The clip 29 is generally L-shaped, and has a short leg 29A upstanding from the inner surface 15A of the cover 15, and a long leg 29B extending transversely to the short leg 29B and terminating in an angularly disposed distal end 29C, which is adapted to engage the sponge 22. An apertured tab 29D extends transversely to the short leg 29A, and a rivet 61 fixes the tab 29A of the clip 29 to the cover 15.

As illustrated in the drawings, the sponge 22 can be easily removed from the clip 29, filled with water and placed in a freezer to enable the water stored in the sponge 22 to be frozen. In this manner, when the sponge 22 is secured in the clip 29 it will slowly defrost over a period of time allowing the reservoir of stored water to be disbursed slowly into the soil 60, thereby helping maintain the soil cool and moist to serve as a healthy environment for worms.

While particular embodiments of the present invention have been disclosed, it is to be understood that various different modifications are possible and are contemplated within the true spirit and scope of the appended claims. For example, the storage container can be configured in a cylindrical shape terminating in a lip defining neck provided with threads for receiving threadably a cap adapted to receive within its inner surface a cylindrical sponge. There is no intention, therefore, of limitations to the exact abstract or disclosure herein presented.

What is claimed is:

1. An apparatus for the storage of live bait comprising:
   a hollow container having an opening for receiving live bait and bait storage media for storage within the hollow interior of the container;
   moisture reservoir means for storing a sufficient quantity of frozen moisture to cool the interior of said container and to attract live bait stored in said container;
   a single cover for removably closing over the opening of said container, said cover having an inner and outer surface, said inner surface adapted to retain releasably said water reservoir within the interior of said container when said cover closes over the opening of said container;
   resilient clip means for retaining releasably said moisture reservoir means to said inner surface of said cover;
   aeration means defining at least one opening in said container disposed oppositely to said cover to permit air to enter into the interior of said container when said apparatus is inverted; and
   inverting means for permitting said container to be rotated about a horizontal axis so that said cover having said moisture reservoir means attached thereto is disposed at a position below said aeration means, whereby live bait within the interior of said container will be attracted toward said moisture reservoir means and said cover and air enter the interior of container through said aeration means opposite to the cover.

2. An apparatus according to claim 1, wherein said aeration means includes at least one circumferential aperture for providing aeration to the interior of said container.

3. An apparatus according to claim 1, wherein said reservoir means for storing a sufficient quantity of frozen moisture includes a sponge.

4. An apparatus according to claim 1, wherein said inverting means includes a pair of pins for inverting the apparatus about a horizontal axis, each pin extending perpendicularly and integrally from the exterior of diametrically opposite portions of said container for engageably receiving and securing the respective and opposite ends of a carrying strap so that a user can rotate the apparatus 360 degrees about an axis extending between said pins.

5. An apparatus according to claim 1, wherein said container further includes latching means so as to secure the cover to said container.

6. An apparatus for storage of live bait, comprising:
   container means for storing live bait storage media; means defining an access opening therein in the top portion thereof;
   closure means movably mounted on said container means for moving between an opened position and a closed position over said opening;
   means defining aeration apertures in the bottom portion of said container means;
   carrying means pivotally attached to said container means for enabling it to be transported in an inverted position;
   moisture reservoir means disposed near said access opening to attract live bait stored in said container means when stored in said inverted position; and
   resilient clip means for retaining releasably said moisture reservoir means to said closure means.

7. A method for using a live bait storage container, having a single cover comprising:
   using the bait storage container for storing live bait;
   substantially filling the container with storage media and live bait;
   storing a moisture containing device having a sufficient quantity of frozen moisture to cool the interior of said container in the interior of the storage container on the cover thereof;
   storing the container in an inverted position so as to bring the media contained in the container into contact with the moisture containing device and the cover and to attract the live bait downwardly toward the cover; and
   inverting the container to permit the cover of the container to be removed without discharging the storage media and live bait and to withdraw bait from the container.

8. In combination with a moisture reservoir for storing a sufficient quantity of frozen moisture to cool the interior of a hollow container, an apparatus for the storage of live bait comprising:
   a single cover for removably closing over the opening of said container, said cover having an inner and outer surface, said inner surface adapted to retain releasably said water reservoir within the interior of said container when said cover closes over the opening of said container;
   resilient clip means for retaining releasably said moisture reservoir means to said inner surface of said cover;
   aeration means defining at least one opening in said container disposed oppositely to said cover to permit air to enter into the interior of said container when said apparatus is inverted; and
   inverting means for permitting said container to be inverted so that cover having said moisture reservoir means attached thereto is disposed at a position below said aeration means, whereby live bait within the interior of said container will be attracted toward said moisture reservoir means and said cover.

* * * * *